United States Patent [19]

Berger et al.

[11] 4,056,668
[45] Nov. 1, 1977

[54] PROCESS FOR THE POLYMERIZATION AND COPOLYMERIZATION OF OLEFINS WITH A SOLID SUPPORT CATALYST

[75] Inventors: Eugene Berger; Pol Gerard; Andre Delbouille, all of Brussels; Jean-Louis Deroitte, Barvaux-sur-Ourthe, all of Belgium

[73] Assignee: Solvay & Cie, Brussels, Belgium

[21] Appl. No.: 681,577

[22] Filed: Apr. 29, 1976

Related U.S. Application Data

[63] Continuation of Ser. No. 676,738, Oct. 20, 1967, abandoned, and Ser. No. 118,998, Feb. 25, 1971, abandoned.

[30] Foreign Application Priority Data

| Oct. 21, 1966 | France | 66.81066 |
| Sept. 1, 1967 | France | 67.119682 |

[51] Int. Cl.$^2$ ............ C08F 4/02; C08F 10/02
[52] U.S. Cl. .............. 526/124; 252/429 C; 252/441; 526/125; 526/148; 526/150; 526/151; 526/348; 526/352
[58] Field of Search ............ 252/429 C, 441; 526/124, 125, 151, 148, 150

[56] References Cited

U.S. PATENT DOCUMENTS

| 2,954,367 | 9/1960 | Vandenberg | 526/151 |
| 3,058,963 | 10/1962 | Vandenberg | 526/159 |
| 3,070,549 | 12/1962 | Ziegler et al. | 526/159 |
| 3,166,542 | 1/1965 | Orzechowski et al. | 526/124 |
| 3,214,417 | 10/1965 | Bloyaert et al. | 526/124 |
| 3,261,821 | 7/1966 | Vandenberg | 526/158 |
| 3,392,159 | 7/1968 | Schooley et al. | 526/151 |
| 3,400,110 | 9/1968 | Dassesse et al. | 526/125 |
| 3,454,547 | 7/1969 | Delbouille et al. | 526/125 |
| 3,506,633 | 4/1970 | Matsuura et al. | 526/156 |

FOREIGN PATENT DOCUMENTS

| 1,405,371 | 5/1965 | France. |
| 1,475,927 | 2/1967 | France. |
| 1,381,947 | 11/1964 | France. |
| 1,560,467 | 2/1969 | France. |
| 2,024,558 | 11/1970 | Germany. |
| 851,112 | 10/1960 | United Kingdom. |
| 1,140,649 | 1/1969 | United Kingdom. |

OTHER PUBLICATIONS

Birnkraut, Inorganic Chemistry, vol. 2, No. 5, Oct. 1963.

*Primary Examiner* — Edward J. Smith
*Attorney, Agent, or Firm* — Pennie & Edmonds

[57] ABSTRACT

Olefins are polymerized and copolymerized in the presence of a solid catalyst which contains an organometallic compound and a solid material having at the surface thereof catalytic complexes containing a divalent metal, halogen, oxygen and a transition metal having halogenated substituents. The solid material of the catalyst is obtained by reacting a liquid halogenated derivative of a transition metal, such as $TiCl_4$ or $VOCl_3$ with a solid support which is a oxygenated compound of a divalent metal and which is substantially anhydrous and also substantially free of hydroxyl groups; examples of such a solid support include calcium, magnesium and zinc oxides and oxygenated salts such as nitrates, sulfates and silicates and organic carboxylate salts including salts of mono- and acetates polycarboxylic acids.

14 Claims, No Drawings

PROCESS FOR THE POLYMERIZATION AND COPOLYMERIZATION OF OLEFINS WITH A SOLID SUPPORT CATALYST

This is a continuation, of application Ser. No. 676,738, filed Oct. 20, 1967, and application Ser. No. 118,998 filed Feb. 25, 1971, both now abandoned.

BACKGROUND OF THE INVENTION

The present invention is directed to a process for the polymerization and the copolymerization of olefins, particulary ethylene, in the presence of solid catalysts.

Belgian Pat. No. 650,679 describes a process for the polymerization and the copolymerization of olefins in the presence of a catalyst obtained by activating with an organometallic compound the reaction product of a compound of a transition metal and a solid hydroxychloride of a divalent metal. The hydroxychloride of a divalent metal is preferably magnesium hydroxychloride of the formula Mg(OH)Cl.

Though it has not yet been established, it is believed that the reaction between the compound of a transition metal and the hydroxychloride of a divalent metal to produce the catalysts described in the above Belgian patent is the result of a chemical bonding by means of the -OH groups of the hydroxychloride.

This reaction may be represented by the following equation:

$$M'X_n + M(OH)Cl \rightarrow X_{n-1}M'-O-M-Cl + HX \quad (1)$$

where
- $M'$ represents a transition metal,
- $X$ is a monovalent reactive group attached to $M'$,
- $M$ is a divalent metal.

the catalytic complex resulting from the above reaction (1) has been represented by the formula $X_{n-1}M'-O-M-Cl$ which accounts for the stoichiometry of the bonding reaction. However, as the compound is at least partially ionic, it is possible that the above formula does not represent exactly the structure of the resulting catalytic complex.

In any case, it is established that this catalytic complex comprises the following elements:
- a divalent metal M, preferably magnesium, chlorine,
- a transition metal $M'$ bonded to the divalent metal by means of oxygen,
- reactive groups X bonded to the transition metal.

The catalytic polymerizations carried out with these complexes, in accordance with the above Belgian patent, have the disadvantage of requiring that the divalent metal compounds be used in the form of hydroxychlorides. These compounds, which are not commerically available, are very sensitive and are costly to prepare. In addition, the hydroxychlorides are unstable and are easily dissociable, thereby producing hydrogen chloride, according to the following reaction:

$$M(OH)Cl \rightarrow MO + HCl \quad (2)$$

SUMMARY OF INVENTION

It has now been discovered that it is possible to prepare catalytic complexes and catalysts having the advantages of the catalysts derived from hydroxychlorides, but which are free of their disadvantages. It has also been discovered that olefins may be polymerized and copolymerized in the presence of the new catalysts with highly desirable results.

The polymerization process according to the invention comprises polymerizing and copolymerizing olefins in the presence of a catalyst comprising an organometallic compound and a solid material having on the surface thereof catalytic complexes comprising a divalent metal, a halogen, oxygen and a transition metal having halogenated substituents. The solid material may be obtained by reacting in the absence of diluent, a liquid halogenated derivative of a transition metal with a solid support comprising an oxygenated compound of a divalent metal, which is anhydrous and substantially free of hydroxyl groups.

While the catalyst composition obtained according to the instant invention is different and superior in several respects to that of the known catalysts which have been discussed above, it has been found that the chemical reactions between a halogenated derivative of a transition metal and an oxygenated compound of a divalent metal mixed therewith, produce catalytic complexes having properties similar to those of the catalytic complexes obtained from a hydroxychloride of the same metal.

DESCRIPTION OF THE PREFERRED EMBODIMENTS

The mechanism and the stoichiometry of the reactions involved in the formation of the catalytic complexes are not known with certainty. However, it has been observed that the bonding of the transition metal to the oxygenated compound occurring in these reactions, is always accompanied by a further bonding of a quantity of halogen which is not directly bonded to the transition metal.

In order to obtain catalytic complexes which are useful for the production of catalysts having the desired properties, it is required that the halogen/transition metal atomic ratio therein be higher than 3, and still more preferably higher than 10.

It is believed that when the oxygenated compound is mixed with the halogenated derivative of the transition metal, there is mainly a superficial hydrochlorination of the support and a bonding reaction of the transition element. The hydrogen halide required for the hydrochlorination is formed within the reaction mixture by reaction of the halogenated derivative with the hydroxyl groups of the support.

The following reactions illustrate this mechanism when using magnesium oxide and titanium tetrachloride:

$$-OH + TiCl_4 \rightarrow -OTiCl_3 + HCl \quad (3)$$

$$MgO + HCl \rightarrow Mg(OH)Cl \quad (4)$$

$$Mg(OH)Cl + TiCl_4 \rightarrow ClMgOTiCl_3 + HCl \quad (5)$$

It is also possible that $MgCl_2 \cdot H_2O$ may be formed according to the reaction $$MgO + 2HCl \rightarrow MgCl_2 \cdot H_2O \quad (6)$$

Large amounts of hydrogen halide are not required in order to carry out the reactions which produce the desired catalytic complexes, since some of the reactions such as reaction (5), regenerate hydrogen halide.

However, it is essential that the elimination of hydrogen halide be prevented as much as possible, otherwise, the intended reactions are not produced.

It is well known that when hydrogen halide is eliminated during the reaction between a solid having hydroxyl groups on the surface thereof and a halide of a transition metal, catalytic complexes are obtained in which the halogen/transition metal atomic ratio is equal and often lower than the valence of the transition metal minus 1, for example, lower than 3 in the case of titanium (British Pat. No. 823,024 dated June 5, 1958 issued to Bataafsche Petroleum Mij). These catalysts are much less active than those obtained according to the present invention.

Water and a high hydroxyl group content are not desirable in the present process for preparing a polymerization catalyst, since these components are harmful to the properties of the catalyst. Therefore, the oxygenated compounds which are used as reactive supports must be anhydrous as far as possible and the reaction should be carried out in the absence of too many hydroxyl groups. Support materials containing less than 0.1 and preferably 0.05 hydroxyl group per molecule are particularly suitable for the preparation of the catalytic complexes. On the other hand, support materials which are highly hydroxylated, such as the hydroxide, do not produce catalysts having interesting properties.

However, it should be mentioned that there is an important exception in the case of the hydroxychlorides, which have already been used and which, though highly hydroxylated, produce good catalysts.

In order to obtain reactive supports corresponding to the above conditions, the oxygenated compounds of the divalent metals are dried for an extended period of time at high temperature, preferably higher than 200° C.

One of the advantages of the process of preparation of the catalysts according to the invention is that catalysts having a low chlorine content are produced, whereas the preparation of catalysts having a low chlorine content is not possible using hydroxychlorides. The catalytic complexes obtained from the hydroxychlorides have a very high chlorine content, such as 460 g/kg, when using Mg(OH)Cl, the Cl/divalent metal atomic artio is generally close to or slightly higher than 1 and the Cl/transition element atomic ratio is comprised between 100 and 300.

On the other hand, the ratio and chlorine content of the catalytic complexes according to the invention, may advantageously be considerably reduced: extremely active catalysts are obtained in which the halogen/divalent metal ratio is lower than 0.05 and the halogen/transition element ratio is above 10. These catalysts are completely stable since the chlorine content is not over 40 g/kg. In this case, the halogen content which may lead to a degradation mechanism according to equation (2) is so low that it can be considered negligible, and there is no risk of corrosion or degradation of the polymer due to the presence of hydrogen halide.

The catalytic complex produced as described above comprises the essential elements of the catalytic complexes previously obtained from the hydroxychlorides of divalent metals, such as:
divalent metal M. preferably magnesium,
a halogen,
oxygen,
a transition metal M' chemically bonded to the support,
halogenated substituents, bonded to the transition metal.

However, the total composition and the nature of the support material of the new catalysts are different than the composition of the complex material at the surface thereof, since the presence of the halide ions is advantageously limited to the superficial layers of the catalyst for the formation of active complexes.

The structure of the new active complexes is similar to that of the complexes derived from hydroxychlorides, and it is believed that the bonding of the transition metal to the support is carried out through oxygen.

The solid compound used as a reactive support is an oxygenated compound of a divalent metal. It is preferably selected from the group consisting of oxygenated compounds of magnesium, calcium and zinc. Even though all the oxygenated compounds of these metals will produce catalytic complexes having interesting properties, commercial oxygenated compounds such as simple or complex oxides, sulfates, nitrates, phosphates and silicates are usually preferred.

Oxygenated compounds of divalent metals derived from mono- or polycarboxylic organic acids are also used for the preparation of very active polymerization catalysts.

The solid support is advantageously selected from compounds having a substantially high carboxylate group content. Derivatives containing magnesium and/or calcium carboxylate groups are particularly suitable to carry out the process according to the invention.

On the other hand, the salts derived from a mono-or polycarboxylic acid and a divalent metal which are used as catalyst support are preferably selected from the compounds having the characteristics of macromolecular compounds. These characteristics are due to the presence of a carbon chain, obtained by the polymerization of a vinyl monomer having carboxylic groups, or to ionic bonds linking a certain number of chains derived from polycarboxylic acids.

As examples of the compounds of the first type, there are the polymers and copolymers containing units derived from acrylates, methacrylates, maleates, fumarates or itaconates of calcium or magnesium. These polymers and copolymers may easily be obtained by completely or partially reacting the polymers and copolymers of the corresponding acids with compounds of divalent metals, in particular, magnesium and calcium. This reaction is generally accompanied by a precipitation of the salt derivative of the polymer.

The compounds of the second type of salts of divalent metals and of non-polymeric polycarboxylic acids, particularly dicarboxylic acids. It is well known that the salts of this type have macromolecular chains in which the link between the chains derived from polycarboxylic acids, in particular dicarboxylic acids, are formed by means of the ionic bridges of the divalent metal.

Examples of polymers having ionic bonds are the polyadipate, the polysebacate and various polyphthalates of magnesium or calcium.

The polymers having ionic bonds are obtained by reacting polycarboxylic acids, particularly dicarboxylic acids, with divalent metal compounds, particularly oxides and hydroxides thereof.

The granulometry of the support is not critical and has no influence in any case on the chemical processes involved during the bonding reaction. However, it is more convenient to use supports having high granulometry, for example, in which the particles have an average diameter of the order of 0.1 mm.

The halogenated derivatives of the transition metals which may be used in the preparation of the new catalysts are selected from the group consisting of chlorides, bromides and oxyhalides of the metals of groups IVa, Va and VIa of the Periodic Table and particularly from the chlorinated derivatives of titanium and vandium: for example $TiCl_4$, $VOCl_3$ and $VCl_4$.

The reaction between the halogenated derivative and the oxygenated compound used as the support should be carried out in the absence of moisture.

The reaction is carried out in the absence of solvent, by simply suspending the oxygenated compound in the substantially pure halogenated derivative which is maintained in the liquid state. The suspension is heated to reaction temperature, generally between 40° and 180° C.

After the bonding reaction, it is possible to extract the solid catalyst by means of the halogenated derivative heated to a temperature of 40° to 180° C.

At this moment, a certain quantity of the transition metal derivative is bonded to the oxygenated compound to form the catalytic support and may not be eliminated purely by physical means. It has been found that a certain quantity of transition metal compound is not eliminated during washing with a hydrocarbon solvent after the bonding reaction.

After the washing step, the catalyst should be activated by reaction with an organometallic compound selected from the organic derivatives of the metals of the Groups I, II, III and IV of the Periodic Table. As activators, there may be used organometallic halides and hydrides, and completely alkylated derivatives, such as dialkyl aluminum halides, alkyl magnesium halides, alkyl aluminum hydrides, alkyl tin halides and silicon containing organic compounds having at least one Si-H bond. The trialkyl aluminum are preferred.

The amount of activator which should be used is not critical as long as the activator is in molar excess with respect to the transmission metal bonded to the support. The activator/bonded transition metal molar ratio is preferably comprised between 10 and 50.

The activation may be carried out immediately before introducing the monomers. It is also possible to mature the catalyst for a more or less extended period of time, at room temperature or at a higher temperature.

The process according to the invention may be used for the polymerization and the copolymerization of olefins, for example for the preparation of polyethylene, polypropylene and ethylene-propylene copolymers.

When used for the polymerization of ethylene, the catalysts according to the invention are extremely active and produce a polyethylene having exceptional properties. For example, this polyethylene has such a linearity that it contains less than one $CH_3$ group per 1000 carbon atoms. It has no traces of trans-internal unsaturation and only 0.01 to 0.20 vinyl double bonds and 0.01 to 0.1 vinylidene double bonds per 1000 carbon atoms. The density of this product is equal to or higher than 0.968 g/cm³ which makes it particularly interesting in injection molding applications.

Besides these properties, which are common to a certain number of catalysts chemically bonded to supports, the catalysts according to the invention have some particularly interesting characteristics.

They are particularly sensitive to the chain transfer action of hydrogen for producing low molecular weight polyethylenes, even some having very low molecular weights, without requiring the use of very high partial pressures of hydrogen.

On the other hand, contrary to the known catalysts, these catalysts are much less sensitive to the action of the poisons of the polymerization catalysts, particularly water and oxygen.

Finally, as a result of the great stability of these new catalysts, their very low transition element compounds content and their extremely high activity, they may be recovered in very small quantities as inert residues which are not harmful to the product obtained in the polymerization reactor. As a consequence, this recovered product does not have to be submitted to a purification treatment and may be used as such. By using the new catalysts according to the invention, there is a very important simplification of the polymerization apparatus and a corresponding reduction in the cost of the product.

Finally, the ethylene-propylene copolymers produced by the process according to the invention have a particularly high propylene content. They have an amorphous structure and exhibit very good elastomeric properties.

The polymerization and the copolymerization may be carried out according to known procedures, in the gaseous phase, in the absence of any liquid medium is a solvent for the monomer, or in the presence of a dispersing medium in which the monomer is soluble. As liquid dispersing medium, an inert hydrocarbon which is liquid under the polymerization conditions may be used. On the other hand, the monomers themselves, which are maintained in a liquid state under their saturation pressure may also be used as the dispersing medium.

By using the catalysts according to the invention for the production of elastomeric copolymers of ethylene and propylene, the reaction may be carried out in a suspension of the liquid monomers. The copolymers are granulated products which may be manipulated with ease. On the contrary, with most of the known catalysts, under these conditions, there is obtained a rubbery compact mass which is difficult to manipulate, therefore such polymerization reactions must be carried out in a solution.

The following examples, are given to further illustrate the invention, and are not to be considered as limiting the invention in any way whatsoever.

EXAMPLE 1

Pure magnesium oxide, for use in analysis, is dried at 400° C. during a period of 16 hours under a dry nitrogen atmosphere. 5 g of dried magnesium oxide are suspended in 25 ml of $TiCl_4$ and the mixture is heated to 130° C. during 1 hour while stirring. Thereafter the solid is transferred into the basket of a Kumagawa type extractor in which an extraction is carried out for 1 hour by using boiling $TiCl_4$. The product is thereafter washed with hexane until all traces of $TiCl_4$ which have not been chemically bonded are eliminated, and traces of chloride in the washing solvent are removed.

The product so obtained was analyzed. It contained by kilogram:
585 g of magnesium
44 g of chlorine
2.5 g of titanium
373.5 g of oxygen (determined by difference)

The chlorine/titanium atomic ratio of the product is 21.6, which indicates that besides bonding of titanium, there was a reaction involving a further bonding of chlorine.

590 mg of the prepared solid catalysts were suspended with 500 ml of hexane in a 1.5 l stainless steel autoclave. Thereafter, there was introduced in the suspension, 0.8 ml of a 500 g/L triisobutyl aluminum solution in hexane corresponding to an Al/Ti atomic ration of 66.6. The temperature of the autoclave is raised to 80° C. followed by the introduction of ethylene and hydrogen. The partial pressures of these two gases are respectively 10 and 5 kg/cm$^2$.

The reaction was carried out for a period of 2 hours at a pressure which is maintained constant by a continuous addition of ethylene, after which any gases remaining in the autoclave where removed therefrom. There are obtained 121 g of polyethylene, which corresponds to a catalytic activity of 4,050 g PE/h.g.Ti.atm C$_2$H$_4$.

An infrared spectro-analysis of the resulting polyethylene shows that it contains less than 1 CH$_3$, 0.15 vinyl double bonds, 0.06 vinylidene double bonds and no trans-internal double bonds per 1000 carbon atoms. The true density is 0.970 g/cm$^3$ and the melting index determined according to the ASTM D 1238-59 T, is 7 g/10 min.

By way of comparison, the same support, dried at 110° C. for 12 hours, was reacted with TiCl$_4$ in a diluted hexane solution. The reaction was carried out at the boiling temperature of hexane and the hydrogen chloride formed during the reaction was flushed with pure nitrogen bubbling within the reaction medium.

The solid product, obtained after a reaction period of 3 hours, had the following composition:

| Magnesium | 505 g/kg |
| O1 | 64 g/kg |
| T1 | 37 g/kg | or a Cl/Ti ratio of 2.34.

0.147 g of this solid product were used with 400 mg of triisobutyl aluminum to carry out a polymerization test under conditions identical to those specified above. After a polymerization period of 2 hours, there were obtained 13 g of 2 hours, there were obtained 13 g of polyethylene, which corresponds to a catalytic activity of 120 g PE/h.g.Ti.atm C$_2$H$_4$.

The melting index, under a high load (21.6 kg) of this polyethylene was 0.3 g/10 min. (ASTM D 1238-59 T).

This comparative test shows that the catalysts according to the invention are more than 30 times more active than those obtained by reacting the same support with TiCl$_4$ in a solution and having a Cl/Ti ratio lower than 3. Furthermore, these last named catalysts are not sensitive to the chain transfer action of hydrogen which is an essential advantage of the catalysts according to the invention as witnessed by the very low melting index and the very high molecular weight of the polyethylene produced in the test of reference.

EXAMPLES 2 to 5

Pure magnesium oxide, for use in analysis was dried at 850° C. under a dry nitrogen atmosphere for a period of 16 hours and is then reacted with TiCl$_4$ under the conditions given in Example 1.

Thr product obtained was analyzed. It contains by kilogram:

581 g of magnesium
34 g of chlorine
5 g of titanium
380 g of oxygen (determined by difference)
or a Cl/Ti atomic ratio of 9.6.

This magnesium oxide, which was dried at a higher temperature than the one used in Example 1, has bonded a larger quantity of titanium than the preceding one. This fact clearly indicates that the quantity of titanium which is bonded is not related to the number of hydroxyl groups present therein.

Other tests have shown the determined effect of too high a content of hydroxyl groups on the supports.

Polymerization tests were carried out with the solid catalyst prepared as described above, according to the process defined in Example 1 but under different partial pressures of hydrogen and ethylene. The results of these tests are given in Table 1 hereinbelow and show the great sensitivity of the catalysts according to the invention to the chain transfer action of hydrogen.

TABLE I

| | Polymerization Conditions | | | | | Results | | | |
|---|---|---|---|---|---|---|---|---|---|
| Test No. | Solid catalyst mg. | Tri-iso-butyl-aluminum mg. | Al/Ti atomic ratio | Partial Pressure C$_2$H$_4$ Kg/cm$^2$ | Partial Pressure H$_2$ Kg/cm$^2$ | Poly-ethyl-ene g. | Catalytic activity g. Pe/ g. Ti.h. atm. C$_2$H$_4$ | Productivity g. of Pe/g. of solid catalyst | Melting index g./10 min |
| 2 | 340 | 400 | 56.5 | 10 | 5 | 155 | 4560 | 456 | 1.34 |
| 3 | 320 | 400 | 60 | 10 | 10 | 128 | 4000 | 400 | 7.1 |
| 4 | 390 | 400 | 49 | 10 | 20 | 119 | 3050 | 305 | 9.5 |
| 5 | 350 | 400 | 55 | 2 | 4 | 34 | 4860 | 97 | 25 |

EXAMPLES 6 TO 10

A catalyst was prepared as described in Example 1 by drying MgO at 500° C.

The analysis of the product of the reaction with TiCl$_4$ is as follows:

| Mg | 579 g/kg |
| Cl | 46 g/kg |
| Ti | 4 g/kg |
| O | 371 g/kg (determined by difference) | or a Cl/Ti ratio of 15.5

With this catalyst and in accordance with the process described in Example 1, there were carried out polymerization tests using different activators. The nature of these activators and the results obtained therewith are given in Table II hereinbelow.

TABLE II

| Test No. | Polymerization Conditions | | | | | Weight of poly-ethylene g | Catalytic activity g. PE/g. Ti.h.atm. C$_2$H$_4$ | Productivity g PE/g. of solid Catalyst |
|---|---|---|---|---|---|---|---|---|
| | Solid catalyst mg. | Activator | | Partial pressure C$_2$H$_4$ Kg/cm$^2$ | Partial pressure H$_2$ Kg/cm$^2$ | | | |
| | | Nature | Quantity mg. | | | | | |
| 6 | 337 | Al(Et)$_3$ | 400 | 10 | 5 | 105 | 3830 | 312 |
| 7 | 33 | Al(Et)$_3$ | 400 | 10 | 55 | 44 | 1640 | 131 |
| 8 | 347 | Al(Et)$_2$Cl | 400 | 10 | 5 | 28 | 1000 | 81 |
| 9 | 383 | Al(Et)Cl$_2$ | 400 | 10 | 5 | 4 | 132 | 10.5 |
| 10 | 518* | Sn(nBu)$_3$H | 600 | 10 | 10 | 2** | 19** | 3.9 |

*This test was carried out by using the solid catalyst for which the preparation and the Tl content are given in Example 11
**Duration of test: 4 hours.

EXAMPLE 11

By using a solid catalyst prepared from dry Mgo as indicated in Example 1 and containing 5.1 g of titanium per kilogram, ethylene and propylene were copolymerized under the following conditions.

In a 1.5 l stainless steel autoclave, there were introduced 500 ml of hexane, 0.8 ml of a 50% triisobutyl aluminum solution in hexane and 5 g of propylene. The temperature of the autoclave was raised to 95° C., ethylene was introduced under a partial pressure of 12 kg/cm$^3$ and hydrogen was introduced under the same partial pressure followed by the addition of 0.192 g of solid catalyst.

The polymerization was carried out under a pressure maintained constant by a continuous injection of ethylene.

After 1 hour, the gases were removed from the unreacted monomers and 71 g of an ethylene-propylene copolymer were separated. The melting index is 28 g/10 min. and the true density is 0.954 g/cm$^3$. The infrared spectro-analysis of this product has shown that it contains 8 CH$_3$ per 1000 carbon atoms.

EXAMPLES 12

5 g of magnesium oxide, dried for a period of 16 hours at 400° C., were suspended in 25 ml of VOCl$_3$. The suspension is heated to 127° C. and is maintained at that temperature for a period of 1 hour. The mixture is cooled and the solid which separates is washed with hexane until all traces of chloride have been eliminated from the washing solvent.

The analysis of the resulting product has given the following results:

| | | |
|---|---|---|
| Mg | 579 | g/kg |
| Cl | 94 | g/kg |
| V | 12 | g/kg |
| O | 315 | g/kg (determined by difference) | or a Cl/V ratio of 11.

530 mg of this product were used for the polymerization of ethylene under the conditions set forth in Example 1. There is obtained 70 g of polyethylene which corresponds to a catalytic activity of 550 g of PE/g.V.-H.atm C$_2$H$_4$. The productivity expressed in gram of polyethylene produced by gram of solid catalyst was 132.

The melting index of this product was 5.4 g/10 min.

EXAMPLE 13

Ethylene and propylene were copolymerized under the conditions given in Example 11 by using 423 mg of the solid catalyst prepared as described in Example 12. There were obtained 52 g of a copolymer of ethylene and propylene having a melting index of 45 g/10 min.

The infrared spectro-analysis has indicated that it contains 9-CH$_3$ per 1000 carbon atoms.

EXAMPLE 14

Ethylene and propylene suspended in the liquid monomers were copolymerized by using a solid catalyst prepared by the reaction of TiCl$_4$ with a magnesium oxide dried at 400° C.

The analysis of this product has given the following results:

| | | |
|---|---|---|
| Mg | 537 | g/kg |
| Cl | 116 | g/kg |
| Ti | 9.2 | g/kg |
| O | 337.8 | g/kg (determined by difference) | or a Cl/Ti ratio of 17.

625 mg of this product are introduced in a 1.5 l autoclave with 133 mg of AlEt$_2$Cl as a 100 g/l solution in hexane. The autoclave is cooled down to −20° C. and there is condensed therein 336 g. or 8 mols of pure dry propylene. The mixture is heated to 40° C. and ethylene was introduced therein so that the molar ratio C$_3$H$_6$/C$_3$H$_6$ + C$_2$H$_4$ in the liquid phase is 0.925.

After 4 hours, the gases were removed from unreacted monomers and 140 g of a rubbery copolymer of ethylene and propylene were isolated.

The productivity, expressed in g of copolymer produced per gram of solid catalyst, is 224. The propylene content of the copolymer is 0.66 mole/ mole of copolymer and its intrinsic vixcosity measured at 120° C. in xylene is 0.14 l/g. The propylene content of the product is remarkably high, especially when taking into account the composition of the monomer mixture.

EXAMPLE 15

A microspheroidal magnesium silicate (catalyst support sold by Davison) was heated at 1000° C., for a period of 15 hours under a dry air circulation. After cooling, the product is mixed with TiCl$_4$ under the conditions given in Example 1. The analysis of the resulting catalytic complex has given the following results:

| | | |
|---|---|---|
| Mg | 156 | g/kg |
| SiO$_2$ | 688 | g/kg |
| Ti | 6 | g/kg |
| Cl | 17 | g/kg | or a Cl/Ti ratio of 3.8.

By using 317 mg of this solid catalyst, there was carried out a polymerization test under the conditions given in Example 1. There is obtained, after 1 hour, 114 g of polyethylene which corresponds to a catalytic activity of 3000 g of PE/g.Ti.h.atm C₂H₄ and a productivity of 360 g PE/g of solid catalyst. The melting index of this product is 0.13 g/10 min.

EXAMPLE 16

Pure magnesium sulfate, for use in analysis, which has been crystallized, was dried under vacuum at 100° C., then under dry air at 250° C. and is reacted with TiCl₄ under the conditions given in Example 1.

The is obtained a catalytic complex having the following composition:

| | |
|---|---|
| Mg | 201 g/kg |
| SO₄ | 779 g/kg |
| Ti | 2.1 g/kg |
| Cl | 7.7 g/kg | or a Cl/Ti ratio of 5.

A polymerization was carried out by using 340 mg of the above catalytic complex under the conditions given in Example 1 and there is obtained 175 g of polyethylene corresponding to a catalytic activity of 12,260 g. PE/g.PE/g. Ti.h.atm C₂H₄ and a productivity of 515 g of PE/g of the solid catalyst. The melting index of the resulting polyethylene is 0.07 g/10 min. and its infrared analysis has shown that it is completely linear.

EXAMPLE 17

Pure calcium oxide, for use in analysis, was heated to 685° C. and after cooling down, it was impregnated with TiCl₄ under the specific conditions given in Example 1. The product obtained has the following analysis:

| | |
|---|---|
| Ca | 641 g/kg |
| Cl | 135 g/kg |
| Ti | 3.3 g/kg |
| O | 220.7 g/kg (determined by difference) | or a Cl/Ti ratio of 55.

610 mg of this catalytic complex were used to carry out a polymerization test under the exact conditions given in Example 1.

There were obtained 44 g of a polyethylene having a melting index of 0.1 g/10 min. and a true density of 0.969 g/cm³. The catalytic activity is 1.090 g PE/g-.Ti.h.atm C₂H₄ and the productivity is 72 g PE/g of solid catalyst.

The infrared analysis indicates the absence of CH₃ groups and of trans-internal double bonds and the presence of 0.03 vinyl double bonds and 0.02 vinylidene double bonds per 1000 carbon atoms.

EXAMPLE 18

Pure zinc oxide, for use in analysis, was heated for 15 hours at 600° C. and is then reacted with TiCl₄ under the conditions given in Example 1. The catalytic complex obtained has the following composition:

| | |
|---|---|
| Zn | 780 g/kg |
| Cl | 20 g/kg |
| Ti | 1.g g/kg |
| O | 196.5 g/kg (determined by difference) | or a Cl/Ti ratio of 18.

A polymerization test was carried out under the conditions given in Example 1 with 570 mg of this catalytic complex resulting in the production of 3 g of polyethylene which corresponds to a catalytic activity of 175 g of PE/g.Ti.h.atm. C₂H₄.

EXAMPLE 19

10 g (0.14 mole) of polyacrylic acid and 30 g (0.14 mole) of tetrahydrated magnesium acetate were each dissolved separately in 1 liter of pure methanol and the acid solution is poured into the acetate solution under strong agitation. There is obtained a precipitate of magnesium polyacrylate which is separated by filtration, washed with methanol and dried. It contains 68 g of Mg per kilogram.

5 g of this precipitate are suspended in 25 ml of pure TiCl₄. The mixture is heated to 120° C. and is maintained at that temperature for a period of 1 hour. The resulting solid is transferred in the basket of a Kumagawa type extractor and an extraction is carried out for 1 hour by using boiling TiCl₄. The solid product is thereafter washed by using anhydrous hexane until all traces of TiCl₄ have been eliminated from the washing solvent and the product is thereafter dried under vacuum.

The product obtained was analyzed. It contains by kilogram:
- 31 g of titanium
- 150 g chlorine or a Cl/Ti atomic ratio of 6.54.

0.954 g of this solid catalyst, corresponding to 29.6 mg of bonded titanium were suspended in 1 liter of pure, dry hexane in a 3 liter autoclave flushed with nitrogen. One g of tripropyl aluminum was introduced in this suspension which corresponds to an Al/Ti atomic ratio of 10. The temperature of the autoclave content was raised to 80° C. and there is introduced therein ethylene and hydrogen under equal partial pressures of 10 kg/cm³.

After a polymerization period or 2 hours during which the pressure was maintained constant by a continuous addition of ethylene, gases were removed from the autoclave and 55 g of polyethylene were collected.

EXAMPLE 20

Magnesium polysebacate was prepared by reacting in a 500 ml flask, 60 g (0.296 mole) of melted sebacic acid and 11.9 g (0.296 mole) of MgO (heavy magnesia BDH), previously dried at 400° C., which was added by small portions.

As the reaction proceeds, the temperature of the reaction medium was raised to keep it liquid. The reaction was terminated at approximately 300° C.

After cooling down, there was obtained an opalescent solid which was ground. The analysis showed that it contains 102 g of Mg per kilogram which corresponds approximately to the formula

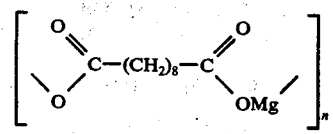

The reaction with TiCl₄ is carried out as described in Example 1 at a temperature of 130° C.. The solid catalyst obtained contains per kilogram:

22 g of titanium
61 g of chlorine

The Cl/Ti atomic ratio is 3.75.

1.220 g of this solid catalyst containing 27 mg of bonded titanium, were used to polymerize ethylene under the same conditions as in Example 19 with the same quantity of activator.

After 2 hours, 83 g of polyethylene, having a melting index of 1.71 g per 10 min., were collected.

On the other hand, the same solid catalyst was used to copolymerize ethylene and propylene. 1.346 g were introduced into a stainless steel 5 liter autoclave dried and flushed with propylene, along with 0.525 g of triisobutyl aluminum and 2.150 ml of dry propylene. After having raised the temperature of the autoclave to 40° C., hydrogen under a partial pressure of 0.2 kg/cm² and ethylene were introduced so as to maintain a constant total pressure of 19.1 kg/cm². After a reaction period of 4 hours, gases were removed from the autoclave and there were obtained 491 g of a copolymer of ethylene and propylene containing 44 mole % of propylene.

EXAMPLE 21

To prepare magnesium polyterephthalate, there were dissolved separately 40 g (0.24 mole) of terephthalic acid and 57 g (0.265 mole) of a tetrahydrated magnesium acetate, each contained in 500 ml of pure dimethyl formamide, after which the acid solution was added to the acetate solution. There is formed a gelatinous precipitate which agglomerates when heated under reflux. This precipitate is then separated by filtration, washed with methanol and dried. The analysis showed a magnesium content of 127 g/kg which corresponds to the formula

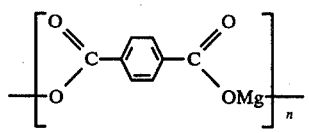

The reaction of magnesium polyterephthalate with TiCl₄ under the conditions given in Example 2 has resulted in a solid catalst for which the analysis has shown that it contains by kilogram:

22 g of titanium
190 g of chlorine or a Cl/Ti atomic ratio of 11.6.

By using 1.15 g of this solid catalyst which contains 25 mg of bonded titanium and by operating under the conditions given in Example 19, it is possible to obtain 184 g of polyethylene having a melting index of 2.12 g/10 min.

For the copolymerization of ethylene and propylene under the conditions given in Example 20 and with the same quantity of activator, 1.26 g of solid catalyst has resulted in the production of 326 g of a copolymer of ethylene and propylene containing 41 mole % of propylene.

Although specific embodiments of this invention have just been described, it is understood that modifications are permissible within the spirit of the invention, the scope of which is to be determined from the appended claims only.

What we claim and desire to secure by Letters Patent are:

1. A process for the polymerization and copolymerization of α-olefins which comprises conducting polymerization or copolymerization in the presence of a catalyst composition comprising
   A. the solid reaction product of (1) a substantially anhydrous, solid, oxygenated magnesium compound containing less than 0.1 hydroxyl group per molecule, and (2) a liquid, halogen-containing transition metal compound selected from the group consisting of the chloride, bromide, and oxyhalide salt of titanium and vanadium, the solid reaction product having a halogen-to-transition metal atomic ratio higher than 3 and the reaction having been carried out so as to prevent the elimination of hydrogen halide from the reaction; and
   B. an organometallic compound selected from the organic derivatives of the metals of Groups I, II, III, and IV of the Periodic Table and being present in a molar concentration greater than that of said transition metal.

2. A process for the polymerization and copolymerization of α-olefins which comprises conducting the polymerization or copolymerization in the presence of a catalyst composition comprising
   A. the solid reaction product of (1) a substantially anhydrous, solid magnesium oxide containing less than 0.1 hydroxyl group per molecule, and (2) a liquid, halogen-containing transition metal compound selected from the group consisting of the chloride, bromide and oxyhalide salts of titanium and vanadium, the solid reaction product having a halogen-to-transition metal atomic ratio higher than 3 and the reaction having been carried out so as to prevent the elimination of hydrogen halide from the reaction; and
   B. an organometallic compound selected from the organic derivatives of the metals of Groups I, II, III and IV of the Periodic Table and being present in a molar concentration greater than that of said transition metal.

3. The process according to claim 2, in which titanium tetrachloride is used as the liquid halogen-containing transition metal compound to form the solid reaction product with the magnesium oxide.

4. The process according to claim 2, in which the organometallic compound is an organoaluminum compound.

5. A process for the polymerization of ethylene which comprises polymerizing the ethylene in the presence of a catalyst composition comprising
   A. the solid reaction product of (1) a substantially anhydrous, solid, oxygenated magnesium compound containing less than 0.1 hydroxyl group per molecule, and (2) a liquid, halogen-containing transition metal compound selected from the group consisting of the chloride, bromide and oxyhalide salts of titanium and vanadium, the solid reaction product having a halogen to transition metal atomic ratio higher than 3 and the reaction having been carried out so as to prevent the elimination of hydrogen halide from the reaction; and
   B. an organometallic compound selected from the organic derivatives of the metals of Groups I, II, III and IV of the Periodic Table and being present in a molar concentration greater than that of said transition metal.

6. The process according to claim 5 in which titanium tetrachloride is used as the liquid halogen-containing transition metal compound to form the solid reaction product with the magnesium compound.

7. The process according to claim 5 in which the organometallic compound is an organoaluminum compound.

8. A process for the copolymerization of ethylene and propylene which comprises copolymerizing the ethylene and propylene in the presence of a catalyst composition comprising
   A. the solid reaction product of (1) a substantially anhydrous, solid, oxygenated magnesium compound containing less than 0.1 hydroxyl group per molecule, and (2) a liquid, halogen-containing transition metal compound selected from the group consisting of the chloride, bromide and oxyhalide salts of titanium and vanadium, the solid reaction product having a halogen-to-transition metal atomic ratio higher than 3 and the reaction having been carried out so as to prevent the elimination of hydrogen halide from the reaction; and
   B. an organometallic compound selected from the organic derivatives of the metals of Groups I, II, III and IV of the Periodic Table and being present in a molar concentration greater than that of said transition metal.

9. A process for the polymerization and copolymerization of 60 -olefins which comprises conducting the polymerization or copolymerization in the presence of a catalyst composition comprising
   A. the solid reaction product of (1) a substantially anhydrous, solid, oxygenated magnesium salt containing less than 0.1 hydroxyl group per molecule, and (2) a liquid, halogen-containing transition metal compound selected from the group consisting of the chloride, bromide, and oxyhalide salts of titanium and vanadium, the solid reaction product having a halogen-to-transition metal atomic ratio higher than 3 and the reaction having been carried out so as to prevent the elimination of hydrogen halide from the reaction; and
   B. the organometallic compound selected from the organic derivatives of the metals of Groups I, II, III and IV of the Periodic Table and being present in a molar concentration greater than that of said transition metal.

10. A catalytic composition for the low pressure polymerization and copolymerization of α-olefins comprising
    A. the solid reaction product of (1) a substantially anhydrous, solid, oxygenated magnesium compound containing less than 0.1 hydroxyl group per molecule and (2) a liquid, halogen-containing transition metal compound selected from the group consisting of the chloride, bromide and oxyhalide salt of titanium and vanadium, the solid reaction product having a halogen-to-transition metal atomic ratio higher than 3; and
    B. an organometallic compound selected from the organic derivatives of the metals of Groups I, II, III and IV of the Periodic Table and being present in a molar concentration greater than that of said transition metal.

11. The catalyst composition according to claim 10 wherein the liquid, halogen-containing transition metal compound is titanium tetrachloride.

12. The catalyst composition according to claim 11 wherein the organometallic compound is an organoaluminum compound.

13. A catalytic composition for the low pressure polymerization and copolymerization of α-olefins comprising
    A. the solid reaction product of (1) a substantially anhydrous, solid, oxygenated magnesium salt containing less than 0.1 hydroxyl group per molecule, and (2) a liquid, halogen-containing transition metal compound selected from the group consisting of the chloride, bromide and oxyhalide salts of titanium and vanadium, the solid reaction products having a halogen-to-transition metal atomic ratio higher than 3; and
    B. an organometallic compound selected from the organic derivatives of the metals of Groups I, II, III and IV of the Periodic Table and being present in a molar concentration greater than that of said transition metal.

14. A solid catalytic complex to be used in combination with an organometallic compound selected from the organic derivatives of the metals of Groups I, II, III and IV of the Periodic Table for the polymerization and copolymerization of α-olefins comprising a solid reaction product of (1) a substantially anhydrous, solid, oxygenated magnesium compound containing less than 0.1 hydroxyl group per molecule, and (2) a liquid, halogen-containing transition metal compound selected from the group consisting of the chloride, bromide, and oxyhalide salt of titanium and vanadium, the solid reaction product having a halogen-to-transition metal atomic ratio higher than 3 and formed under reaction conditions which prevent the elimination of hydrogen halide from the reaction.

* * * * *

UNITED STATES PATENT AND TRADEMARK OFFICE
CERTIFICATE OF CORRECTION

PATENT NO. : 4,056,668
DATED : November 1, 1977
INVENTOR(S) : Eugene Berger et al.

It is certified that error appears in the above-identified patent and that said Letters Patent are hereby corrected as shown below:

Column 3, line 45, for "artio" substitute --ratio--.
Column 5, line 41, for "transmission" substitute --transition--.
Column 7, line 52, for "Ol: 64 g/kg" substitute --Cl: 64 g/kg--;
line 53, for "Tl: 37 g/kg" substitute --Ti: 37 g/kg--.
Column 8, line 12, for "Thr" substitute --The--.
Columns 9 and 10, second item in column 2, for "33" substitute --336--;
first item in column 3, for "Al(Et)$_3$" substitute --Al(iBu)$_3$--.
Column 11, line 24, delete the second "PE/g.";
line 65, for "196.5" substitute --198.5--.
Column 15, line 27, for "60 -olefins" substitute -- ∝-olefins--.

Signed and Sealed this

Eleventh Day of April 1978

[SEAL]

Attest:

RUTH C. MASON
Attesting Officer

LUTRELLE F. PARKER
Acting Commissioner of Patents and Trademarks